United States Patent [19]

Sutera et al.

[11] Patent Number: 4,638,327

[45] Date of Patent: Jan. 20, 1987

[54] APPARATUS TO DAMP TURBULENCE IN AN INK JET FLUID SUPPLY CHAMBER

[75] Inventors: Richard Sutera, Centerville; John L. Dressler, Spring Valley; Bruce W. Halliday, Centerville, all of Ohio

[73] Assignee: Burlington Industries, Inc., Greensboro, N.C.

[21] Appl. No.: 720,735

[22] Filed: Apr. 8, 1985

[51] Int. Cl.[4] .............. G01D 15/18

[52] U.S. Cl. .............. 346/75; 138/41; 239/553.5; 239/590.5; 346/140 R; 346/1.1

[58] Field of Search .............. 346/75, 140, 1.1; 239/590.3, 590.5, 553.3, 553.5; 138/39, 40, 41, 42

[56] References Cited

U.S. PATENT DOCUMENTS

| | | | |
|---|---|---|---|
| 3,353,564 | 11/1967 | Bergeijk | 138/41 |
| 3,606,973 | 9/1971 | Davis | 346/75 |
| 3,630,455 | 12/1971 | Parkison | 239/590.3 X |
| 3,645,298 | 2/1972 | Roberts | 138/40 |
| 3,645,448 | 2/1972 | Houser | 346/75 X |
| 4,080,607 | 3/1978 | Van Breemen | 346/75 |
| 4,119,276 | 10/1978 | Nelson | 239/590.3 |

*Primary Examiner*—Joseph W. Hartary
*Attorney, Agent, or Firm*—Nixon & Vanderhye

[57] ABSTRACT

A turbulence damping apparatus for a fluid supply chamber of an ink-jet printing head assembly substantially damps multiaxis or turbulent fluid flow immediately upstream of an orifice plate from which at least one column of sequential fluid droplets is issued. The apparatus includes a center support member which defines openings and is adapted for rigid disposition in the fluid supply chamber to thus define upper and lower subchambers. Upper and lower damping structures are rigidly fixed to the upper and lower surfaces, respectively, of the center support member. The upper and lower damping structures respectively include upper and lower apertures such that initial damping of turbulent fluid flow is effected as the fluid flow through the upper apertures and into the openings of the center support member with final damping of the turbulent flow being accomplished as the fluid flows through the lower apertures.

10 Claims, 3 Drawing Figures

APPARATUS TO DAMP TURBULENCE IN AN INK JET FLUID SUPPLY CHAMBER

FIELD OF INVENTION

The present invention relates to the field of non-contact fluid marking devices which are commonly known as "ink-jet" or "fluid-jet" devices. More particularly, the present invention relates to apparatus which substantially damps turbulence in a fluid supply chamber of ink-jet or fluid-jet devices.

BACKGROUND OF THE PRESENT INVENTION

Ink-jet devices in and of themselves are well known through e.g. U.S. Pat. No. 3,373,437 to SWEET et al, U.S. Pat. No. 3,560,988 to CRICK; U.S. Pat. No. 3,579,721 to KALTENBACH; and U.S. Pat. No. 3,596,275 to SWEET. Typically, prior art ink-jet devices provide a linear array of fluid-jet orifices formed in an orifice plate from which filaments of pressurized marking fluid (e.g. ink, dye, etc.) are caused to issue from a fluid supply chamber. An individually controllable electrostatic charging electrode is disposed downstream of the orifice plate along the so-called "drop-formation" zone. In accordance with well known principles of electrostatic induction, the fluid filament is caused to assume an electrical potential opposite in polarity and related in magnitude to the electrical potential of its respective chargingl electrode. When a droplet of fluid is separated from the filament, the induced electrostatic charge is then trapped on and in the droplet. Thus, subsequent passage of the charged droplet thorough an electrostatic field having the same polarity as the droplet charge will cause the droplet to be deflected away from a normal droplet path towards a droplet catching structure. Uncharged droplets on the other hand proceed along the normal path and are eventually deposited upon a recording substrate.

Recently it has been proposed to utilize ink-jet devices as a means to print patterns or the like on textile materials, attention being directed to U.S. Ser. No. 428,490 to GAMBLIN filed Sept. 28, 1982, now U.S. Pat. No. 4,523,202, the entire disclosure thereof being expressly incorporated hereinto by reference. In order to achieve fine printing of patterns on a textile substrate, it is necessary to utilize an orifice plate having a linear array of very small orifices sized in the range of, for example, 0.00035 to 0.020 inch diameters. A problem exists that with use of such small-sized orifices, turbulent or multiaxis fluid flow in the fluid supply chamber adversely affects droplet formation. That is, turbulent flow in the fluid supply chamber could lead to inconsistent droplet charging and deflection and thus less perfect printing on the substrate.

SUMMARY OF THE PRESENT INVENTION

The present invention is directed to a device which effectively damps flow turbulence in a fluid supply chamber of an ink-jet device. Although the manner in which the present invention effectively damps flow turbulence is not fully understood at this time, it is surmised that the composite structure of the present invention damps or substantially removes multiaxis or turbulent flow patterns (e.g. so-called "eddy currents") in the fluid so as to achieve substantially single axis fluid flow within the fluid supply chamber immediately upstream of each orifice in the orifice plate. Thus, the present invention provides the means by which turbulent flow patterns which may exist in the fluid supply chamber are sufficiently damped so that proper issuance of the jet streams through the orifices can be achieved.

These advantages of the present invention are realized by a composite structure having a center planar support member and upper and lower damping members attached to its upper and lower surfaces, respectively. The center support member is positioned in a fluid supply chamber so as to establish upper and lower subchambers. The center support member is provided, in part, to increase the structural rigidity of the composite damping structure so as to prevent collapse of the structure due to the pressure differential thereacross as the fluid flows from the upper subchamber to the lower subchamber. The center support member includes relatively large-diameter (e.g. $\frac{3}{8}$ inch diameter) apertures formed across the length thereof so as to establish turbulence-quieting chambers between the upper and lower damping members.

The upper and lower damping members each define a relatively dense array of apertures therein so that multiaxis flow patterns of fluid passing therethrough will be effectively damped.

The present invention is thought to provide a stepwise damping of the fluid turbulence as the fluid flows between the upper and lower subchambers; that is, the upper damping member initially damps multiaxis flow patterns in the fluid as the fluid flows therethrough from the upper subchamber and into the quieting chambers of the center support. This initially damped fluid is quieted in the quieting chambers and then flows through the lower apertures of the lower damping member whereby damping of any remaining multiaxis fluid flow occurs. The upper apertures are preferably of larger size (e.g. 30 to 40 mesh) when compared to the size of the lower apertures (e.g. about 75 mesh) so that the stepwise damping of the fluid as described is accomplished.

The larger-sized upper apertures also permit the escape of air which may be entrapped in the quieting chambers during start-up of the ink-jet head in which the present invention is utilized. Thus, air which may be prevented from flowing from the quieting chambers to the subchamber due to the relatively small size of the lower apertures during start-up is nonetheless permitted to escape through the upper apertures due to their relatively large size. Air accumulating in the upper subchamber will then be vented prior to printing operation of the ink-jet head to thereby ensure that the fluid chamber is substantially free of entrapped air.

Further advantages of the present invention will become more apparent after careful consideration is given to the description of the preferred exemplary embodiment thereof.

INFORMATION DISCLOSURE STATEMENT

The reader's attention is directed to the following U.S. patents so that a more complete understanding of the novel aspects of the present invention can be obtained:

U.S. Pat. No. 4,080,607 to Van Breemen et al
U.S. Pat. No. 4,403,228 to Miura et al
U.S. Pat. No. 4,260,996 to Wittwer
U.S. Pat. No. 4,167,742 to Head et al
U.S. Pat. No. 4,419,673 to Ebi et al Van Breemen et al '607 discloses a screen-type inlet plate 75 as being located in the manifold chamber upstream of orifice plate 60 so as to achieve turbulence reduction in the flush fluid or ink being supplied to the orifice plate 60. Screen-type inlet plate 75 is described as being a single-element screen of relatively coarse (i.e. 0.3 mm or about 35 mesh) openings spaced 0.5 mm apart.

Miura et al '228 discloses that a mesh structure 101 is in contact with ink in an opening 102 formed in frame 100, attention being specifically directed to FIG. 14 and the discussion relative thereto appearing at col. 5, line 65 through col. 6, line 4. The disclosed function of mesh structure 101 of Miura et al '228 is to provide a meniscus forming surface on which plural menisci are formed and retained.

Wittwer '996 discloses an ink jet head having an ink droplet aspirator. The aspirating device of Wittwer '966 may include filters 17, 18 which smooth the air passing therethrough to reduce turbulence and create, as closely as possible, laminar air flow through tunnel 31.

Head et al '742 discloses structure which acts as a damping means to damp out traveling wave vibrations in an orifice plate.

Finally, Ebi et al '673 merely discloses that filters 10 can be provided in the path of fluid flow presumably for the removal of impurities from the fluid stream.

BRIEF DESCRIPTION OF THE ACCOMPANYING DRAWINGS

Reference will be hereinafter made to the accompanying drawings wherein like reference numerals throughout the various figures denote like structural elements and wherein.

DETAILED DESCRIPTION OF THE PREFERRED EXEMPLARY EMBODIMENT

Figure 1:
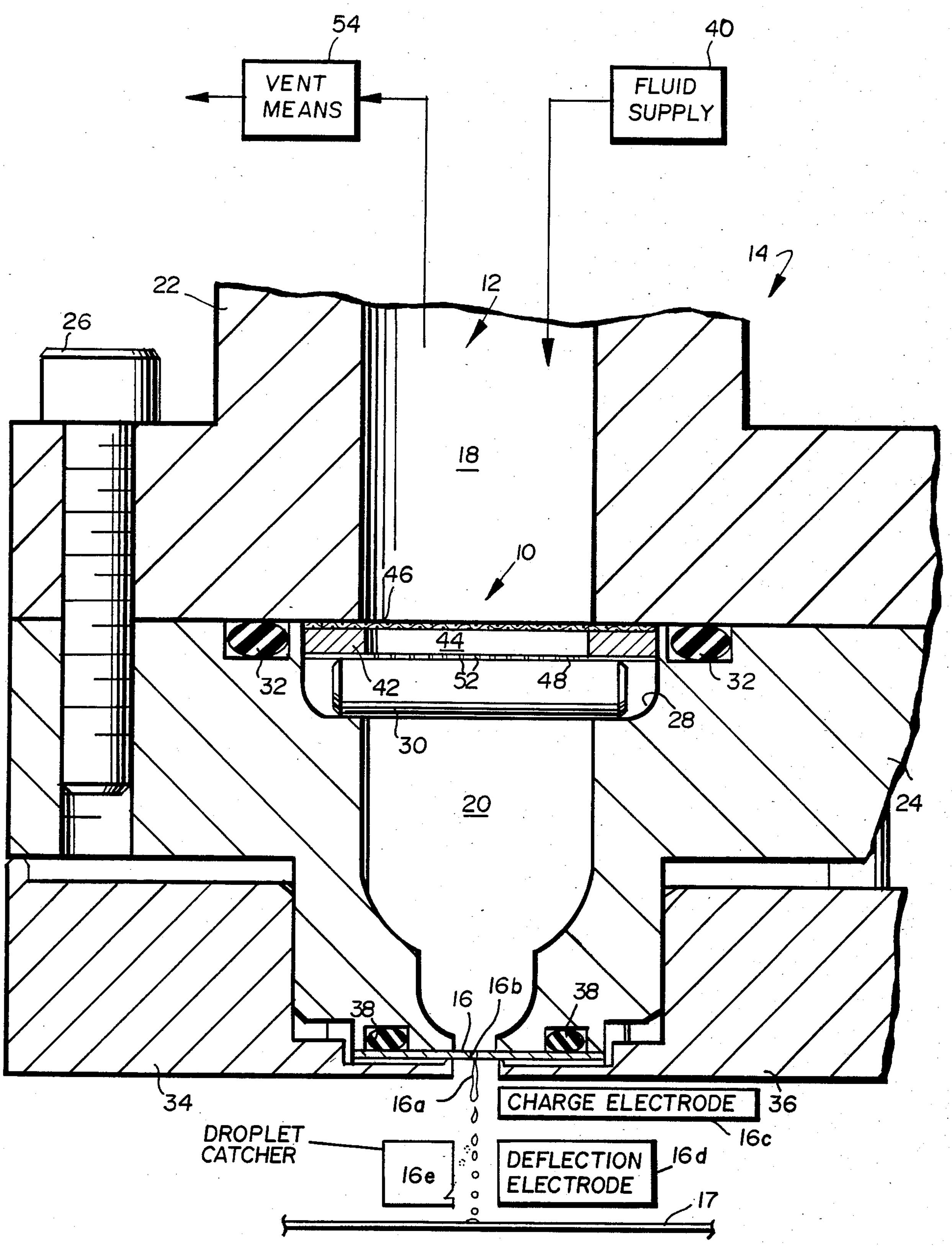
FIG. 1 is a partial cross-sectional elevational view of a print head assembly for an ink-jet device utilizing the apparatus of the present invention.

As shown in FIG. 1, the composite turbulence damping structure 10 of the present invention is disposed in a rigid manner within the fluid supply chamber 12 of an ink jet printhead 14 upstream of an orifice plate 16 so as to establish upper and lower subchambers 18, 20, respectively. Printhead 14 is preferably formed by cooperating upper and lower manifold members 22, 24, respectively, so as to permit access to be gained to the turbulence damping structure 10. Suitable machined bolts 26 or other like structures are utilized to couple upper and lower manifold members 22, 24, respectively. Lower manifold member 24 preferably defines opposing recessed surfaces 28 to accept support rods 30 (see FIG. 2) attached to turbulence-damping structure 10 so as to support structure 10 in operative alignment with chamber 12. Suitable resilient sealing structures 32 are provided in lower manifold member 24 so as to seal the upper and lower manifold members 22, 24 against fluid leakage.

Orifice plate 16 is seated against the lower end of lower manifold member 24 by means of clamps 34, 36 which are rigidly coupled to lower manifold member 24 by means not shown. Orifice plate 16 is also sealed against fluid leakage by resilient seals 38.

Fluid which is supplied to chamber 12 from fluid supply 40 flows thorough turbulence-damping structure 10 and thence on to orifice plate 16 whereby at least one jet **16*b* of the fluid issues thorough orifice 16*a* formed therein. As is well known, the fluid jet 16*b* receives a charge potential by means of charge electrode 16*c* so as cause the fluid jet 16*b* to assume a charge potential opposite in polarity and related in magnitude to the electrical potential to the charge electrode 16*c*. Charged droplets (noted by dotted lines in FIG. 1) separated from fluid jet 16*a* are thus deflected by means of deflection electrode 16*d* towards droplet catcher 16*e* while uncharged droplets (noted by solid lines in FIG. 1) continue on to print substrate 17**.

Figure 2:
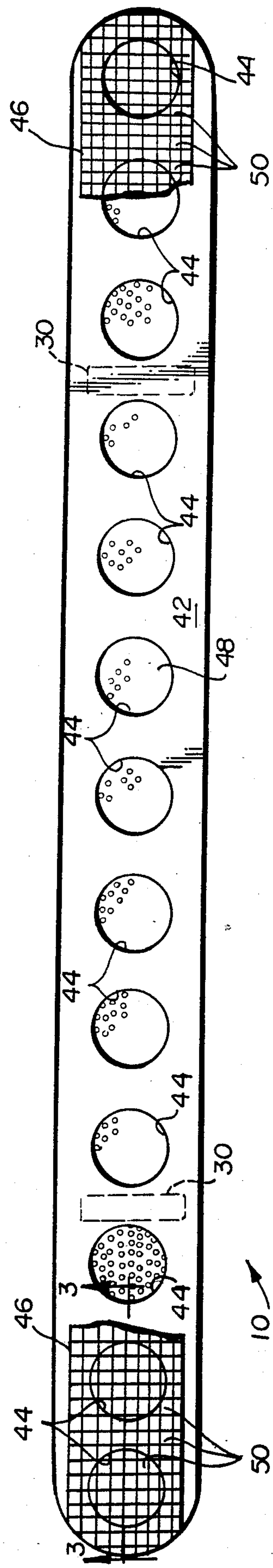
FIG. 2 is a top plan view, partly in section, of the apparatus of the present invention.
Figure 3:
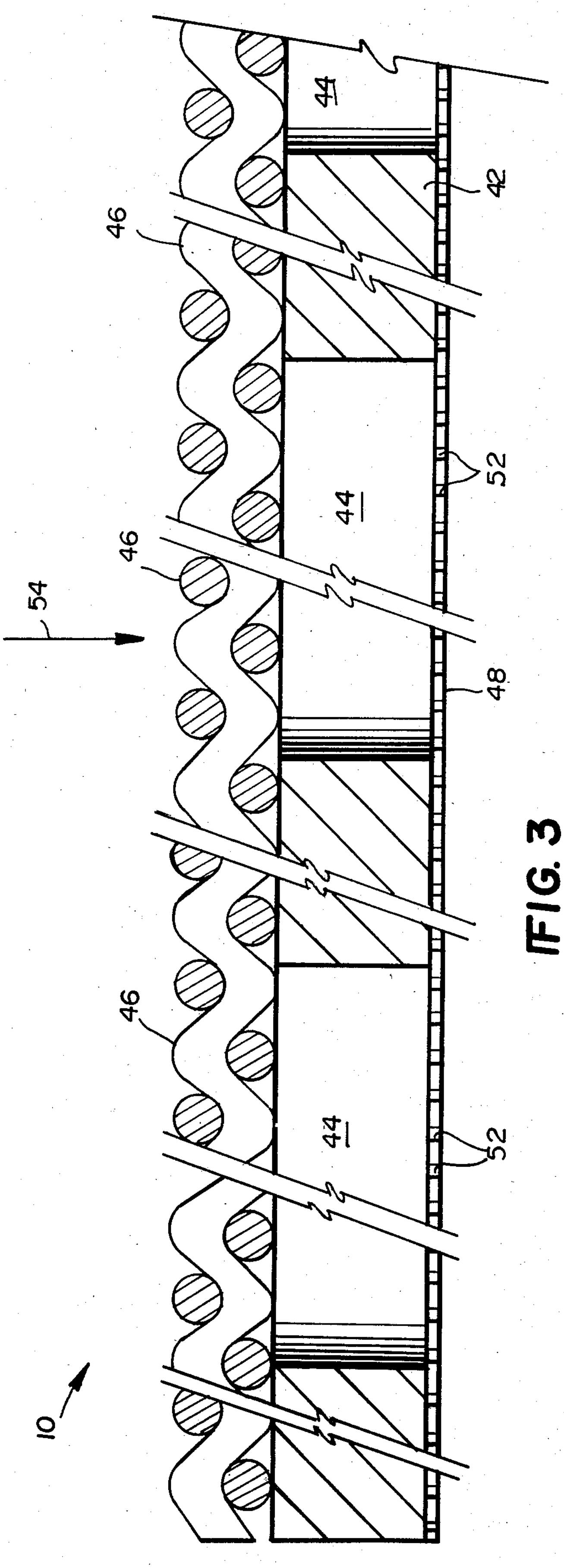
FIG. 3 is a cross-sectional elevational view of the apparatus of the present invention taken along line 3—3 in FIG. 2 and being shown in a greatly enlarged manner for clarity of presentation.

The structure of the present invention can be more clearly seen by referring to FIGS. 2 and 3. As shown, structure 10 includes a central support member 42 which performs a baffling function and which defines relatively large-sized apertures 44 axially aligned along the length of support 42. Apertures 44 are preferably circular in configuration and are conveniently $\frac{3}{8}$ inch diameter on $\frac{5}{8}$ inch center-to-center spacings. Other sizes and geometric configurations can however be advantageously used in accordance with the present invention. While material from which center support 42 is fabricated depends upon the fluid being utilized, it is presently preferred to fabricate center support 42 from 20 gauge (0.035 inch) stainless steel. Other metals and rigid plastic materials could however be advantageously utilized.

An upper damping member 46 is fixed to the upper surface of center support 42 while a lower damping member 48 is fixed to the lower surface of support 42. Preferably, upper damping member 46 is in the form of a relatively coarsely woven 30–40 mesh wire screen (e.g. approximately 0.020 to 0.015 inch apertures) having a thickness of about 0.024 inch and being formed of stainless steel wires having about 0.013 inch diameters. Thus, relatively large-sized apertures 50 are established by virtue of the screen-like structure of the upper damping member 46 to permit the passage of fluid and air therethrough and to effect initial damping functions to the flowing fluid.

Lower damping member 48 on the other hand preferably defines a dense array of small-sized apertures 52 to further damp multiaxis flow patterns in the fluid. As indicated above, the small size of the lower apertures 52 (preferably about 75 mesh or approximately 0.0074 inch diameter circular holes) may prevent air from passing therethrough during start-up operations. The air however is permitted to pass upwardly through the larger-sized upper apertures 50 in upper damping member 46 and accumulate in the upper portion of chamber 12 from which it is vented by vent means 54 (see FIG. 1).

With the above-discussed composite arrangement of turbulence-damping structure 10, the following beneficial functions accrue. As the fluid flows across the cross-section of structure 10 (generally noted by arrow 54 in FIG. 3) it first encounters upper damping member 46. As the fluid flows through the apertures 50 of upper damping member 46, a substantial portion of the multiaxis flow which may have existed upstream of member 46 is believed to be effectively damped due to the blocking affect of the individual wires which form apertures 50. This initially-damped fluid then flows into baffle apertures 44 which apparently function as individual turbulence-quieting chambers between the upper and lower damping members 46, 48, respectively. That is, fluid in apertures 44 between members 46 and 48 may be stilled such that final damping of any residual multiaxis flow patterns is better achieved when the fluid subsequently flows through lower damping member 48 and its associated apertures 52.

Immediately downstream of lower damping member 48, the fluid will thus be substantially damped of the multiaxis flow existing upstream of upper damping member 46 and presumably will assume substantially single-axis flow in the direction of arrow 54. In such a manner, the composite damping structure 10 of the present invention provides improved means by which fluid immediately upstream of the orifice plate 16 may be induced to assume non-turbulent flow substantially perpendicular to the orifice plate 16 so as to enhance the fluid jet-forming efficiency of orifices 16*b* formed in plate 16.

While preferred materials of the structure 10 for both the upper and lower damping members 46, 48 as well as center support 42 have been indicated as being stainless steel, other suitable metallic and/or non-metallic rigid materials could also be advantageously utilized. Such materials must of course be compatible with the type of fluid which is being treated and the pressure existing within chamber 12. Accordingly, while the present invention has been herein described in what is presently conceived to be the most preferred embodiment thereof, those in this art may recognize that many modifications may be made while yet retaining many of the novel features of this invention, which modifications shall be accorded the broadest scope of the appended claim so as to encompass all equivalent structures and/or assemblies.

What is claimed is:

1. Turbulence damping structure for a fluid supply chamber of an ink-jet printing head assembly comprising:

upper and lower damping members each defining upper and lower apertures, respectively; and a support member having plural openings therein, said support member being rigidly fixed between and separating said upper and lower damping members and, together with said upper and lower damping members, dividing said fluid chamber into upper and lower subchambers such that said openings establish fluid communication between respective ones of said upper and lower apertures, wherein said openings between said upper and lower damping members define a plurality of fluid quieting chambers, and wherein said damping fluid structure provides step-wise damping of fluid in said fluid supply chamber.

2. Turbulence damping apparatus for a fluid supply chamber of an ink-jet printing head assembly to substantially damp multiaxis fluid flow immediately upstream of an orifice plate from which at least one column of sequential fluid droplets is issued, said apparatus comprising:

a center support having upper and lower surfaces and opposing ends adapted for rigid disposition in said fluid supply chamber to thereby define upper and lower subchambers and including openings therethrough;

upper and lower damping means defining upper and lower apertures and disposed adjacent to said upper and lower surfaces of said center support, respectively, said openings between said upper and lower damping means defining respective quieting chambers, wherein said upper damping means initially damps multiaxis flow of said fluid as said fluid flows from said upper chamber and into said quieting chambers through said upper apertures; and wherein said lower damping means further damps multiaxis flow of said fluid as said fluid flows from said quieting chamber to said lower subchamber through said lower openings whereby multiaxis fluid flow in said lower subchamber is substantially damped.

3. Apparatus as in claim 2 wherein said upper apertures are defined by a 30–40 mesh screen structure.

4. Apparatus as in claim 3 wherein said openings of said center support are each about ⅜ inch diameter circular openings.

5. Apparatus as in claim 2 wherein said lower apertures comprise a dense array of apertures each of about 75 mesh size.

6. In a fluid-jet apparatus of the type including printhead means defining a fluid supply chamber and including an orifice plate for issuing a linear array of fluid droplet streams, means for charging selected droplets in said streams, and means for deflecting said selected droplets from a normal droplet path towards a droplet catching structure, the improvement comprising turbulence damping means for damping fluid turbulence in said fluid supply chamber prior to said fluid issusing from said orifice plate, said turbulence damping means including:

upper and lower damping means defining upper and lower apertures, respectively, for establishing substantially unidirectional flow of fluid immediately upstream of said orifice plate;

support means having plural openings therein for rigidly interconnecting sand separating said upper and lower damping means to define a space therebetween, said support means being rigidly positioned in said fluid supply chamber to establish an upper subchamber adjacent said upper damping means and a lower subchamber adjacent said lower damping means such that said openings establish fluid communication between respective ones of said upper and lower apertures, wherein said openings between said upper and lower damping means define a plurality of fluid quieting chambers, and wherein said damping means provides step-wise damping of fluid in said fluid supply chamber.

7. A fluid-jet apparatus as in claim 6 wherein said printhead means includes means defining opposing recessed surfaces for acommodating said damping means and for mounting said damping means in rigid disposition therein.

8. A fluid-jet apparatus as in claim 7 wherein said damping means includes support rod means transversely fixed to said lower damping means so as to bridge said opposing recessed surfaces to support said damping means in said fluid supply chamber.

9. A method for substantially damping multiaxis fluid flow in a fluid supply chamber of an ink-jet print head immediately upstream of an orifice plate from which at least one column of sequential fluid droplets issues, said method comprising the sequential steps of:

(a) passing fluid through upper apertures of an upper damping structure to thereby initially damp a portion of said multiaxis flow so that said fluid exhibits less multiaxis flow downstream of said upper damping structure as compared to upstream of said upper damping structure;

(b) allowing the fluid initially damped according to step (a) to be quieted in a quieting chamber defined between said upper and lower damping structures; and (c) Subsequently passing the initially damped fluid through lower apertures of a lower damping structure to further damp remaining multiaxis fluid flow and to substantially remove multiaxis fluid flow downstream of said lower damping structure, wherein said fluid is step-wise damped in said fluid supply chamber.

10. A method as in claim 9 wherein prior to step (a) there is practiced the step of positioning said upper and lower damping structures in said fluid supply chamber to establish therein an upper subchamber upstream of said upper damping structure and a lower subchamber downstream of said lower damping structure.

* * * * *